US007738610B2

(12) United States Patent
Chan et al.

(10) Patent No.: US 7,738,610 B2
(45) Date of Patent: Jun. 15, 2010

(54) METHOD AND APPARATUS FOR AUTOMATIC ALIGNMENT OF NOTCH FILTERS

(75) Inventors: Seong K. Chan, Singapore (SG); Jeffery K. Hunter, Olathe, KS (US)

(73) Assignee: Honeywell International Inc., Morristown, NJ (US)

( * ) Notice: Subject to any disclaimer, the term of this patent is extended or adjusted under 35 U.S.C. 154(b) by 1270 days.

(21) Appl. No.: 11/217,656

(22) Filed: Aug. 31, 2005

(65) Prior Publication Data
US 2007/0047681 A1    Mar. 1, 2007

(51) Int. Cl.
H04B 1/10   (2006.01)
(52) U.S. Cl. .................. 375/350; 375/148; 375/285; 375/144; 375/346; 333/175; 333/176; 333/167; 333/170; 333/171; 381/71.11; 381/93; 381/94.1; 455/63.1; 455/67.13
(58) Field of Classification Search .............. 375/148, 375/285, 346, 144, 350
See application file for complete search history.

(56) References Cited

U.S. PATENT DOCUMENTS

| 3,867,712 | A | * | 2/1975 | Harthill et al. | ............... 367/118 |
| 3,967,102 | A | * | 6/1976 | McCown | ................... 708/322 |
| 4,325,382 | A | * | 4/1982 | Miodownik | ................. 600/486 |
| 4,665,404 | A | * | 5/1987 | Christy et al. | ............... 342/463 |
| 5,280,640 | A | * | 1/1994 | Bae | .......................... 455/182.3 |
| 5,331,299 | A | * | 7/1994 | Smith | ......................... 333/175 |
| 5,519,890 | A |   | 5/1996 | Pinckley | |
| 5,808,463 | A | * | 9/1998 | Nagano | .................... 324/76.21 |
| 5,867,342 | A | * | 2/1999 | Hattori | ..................... 360/77.08 |
| 6,020,783 | A |   | 2/2000 | Coppola | |
| 6,052,420 | A | * | 4/2000 | Yeap et al. | .................. 375/346 |
| 6,219,376 | B1 | * | 4/2001 | Zhodzishsky et al. | ........ 375/148 |
| 6,844,693 | B2 | * | 1/2005 | Tazawa et al. | .............. 318/561 |
| 6,873,212 | B2 |   | 3/2005 | Rogers | |
| 2002/0154614 | A1 |   | 10/2002 | Jagger et al. | |
| 2004/0176034 | A1 | * | 9/2004 | Hunter et al. | ............... 455/63.1 |
| 2007/0201590 | A1 | * | 8/2007 | Kolze et al. | .................. 375/350 |

FOREIGN PATENT DOCUMENTS

EP   0546723   6/1993
WO   03058271  7/2003

OTHER PUBLICATIONS

European Patent Office, "European Search Report", Feb. 4, 2008, Published in: EP.

* cited by examiner

*Primary Examiner*—Chieh M Fan
*Assistant Examiner*—Sui M Lee
(74) *Attorney, Agent, or Firm*—Fogg & Powers LLC

(57) ABSTRACT

A method and apparatus are provided for automatic alignment of a notch filter in a receiver. The method comprises the steps of determining a frequency of an interfering signal, monitoring an energy in the interfering signal, tuning the notch filter based on an initial tune value, detecting an energy content in the radio signal after the tuning step, incrementally tuning the notch filter away from the initial tune value while monitoring the energy in the interfering signal, repeating the step of detecting and the step of incrementally tuning until the energy in the interfering signal is minimized, and storing a new tune value as the initial tune value. The notch filter is configured to filter the radio signal. The new tune value indicates a minimized energy in the interfering signal.

10 Claims, 3 Drawing Sheets

METHOD AND APPARATUS FOR AUTOMATIC ALIGNMENT OF NOTCH FILTERS

FIELD OF THE INVENTION

The present invention generally relates to radio receivers, and more particularly relates to methods and receiver systems for attenuating undesired frequencies in an operational frequency band.

BACKGROUND OF THE INVENTION

An interfering signal may decrease reception of a desired Radio Frequency (RF) signal. An RF signal usually includes a carrier signal with information modulated onto the carrier signal. The front-end of a radio receiver typically amplifies the RF signal and mixes the amplified signal to a base band or to an Intermediate Frequency (IF) for detection of the information. Detection of the information may be impeded by the presence of one or more interfering signals.

Various types of filters have been used to remove the interfering signals from the desired RF signal. In one example, a notch filter is used to remove an interfering signal by selecting a notch filter having a pre-determined center frequency (e.g., a center frequency set at the time of manufacture) that is similar to the frequencies of known interfering signals. The notch filter may be affected by temperature, device aging, and other factors to alter the center frequency. For example, the accuracy of the notch filter is typically determined by the center frequency of the notch filter, which would represent the deepest loss in a transmission path, and a programmed notch frequency. This accuracy may be represented by $(F_{programmed} - F_{center})/(F_{center})$, where $F_{programmed}$ is an input frequency for the notch filter, and $F_{center}$ is an actual center frequency of the notch filter.

Accordingly, it is desirable to provide a method for aligning a notch filter to reject an interfering signal in a radio signal. In addition, it is desirable to provide a system for aligning a notch filter to reject an interfering signal in a radio signal. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Methods and systems are provided for automatically aligning a notch filter to reduce interference during radio signal reception. In an exemplary embodiment, a method is provided for aligning a notch filter to reject an interfering signal in a radio signal. The method comprises the steps of determining a frequency of the interfering signal, monitoring an energy in the interfering signal, tuning the notch filter based on an initial tune value, detecting an energy content in the radio signal, incrementally tuning the notch filter away from the initial tune value while monitoring the energy in the interfering signal, repeating the step of detecting and the step of incrementally tuning until the energy in the interfering signal is minimized, and storing a new tune value as the initial tune value. The new tune value indicates a minimized energy in the interfering signal. The notch filter is configured to filter the radio signal.

In another exemplary embodiment, a system is provided for reducing an interfering signal in a radio signal. The system comprises a first notch filter having first and second inputs and having an output, a signal analyzer having an input configured to receive an Intermediate Frequency (IF) signal and having an output, and a processing unit having an input coupled to the output of the signal analyzer and having an output coupled to the second input of the first notch filter. The first input of the first notch filter is configured to receive the radio signal, and the first notch filter is configured to produce a first filtered signal at the output of the first notch filter. The IF signal is based on the first filtered signal, and the signal analyzer is configured to detect an energy content in the radio signal. The processing unit is configured to: a) determine a frequency of the interfering signal and monitor an energy in the interfering signal; b) tune the first notch filter to an initial tune value; c) detect an energy content in the radio signal; d) tune the first notch filter away from the initial tune value while monitoring said energy in the interfering signal; e) repeat c)-d) until the energy in the interfering signal is at least partially minimized; and f) store a new tune value as the initial tune value. The new tune value indicates an at least partially minimized energy in the interfering signal.

In yet another exemplary embodiment, a method is provided for reducing an interfering signal in a radio signal. The method comprises the steps of filtering the radio signal through a notch filter having a center frequency tuned to an initial value, translating the radio signal to an IF signal after the filtering step, detecting an energy content of the radio signal by fast Fourier transforming the IF signal, tuning the center frequency away from the initial value while monitoring an energy of the interfering signal, and repeating the detecting step and the tuning step until the energy in the interfering signal is at least partially minimized indicating a new value.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
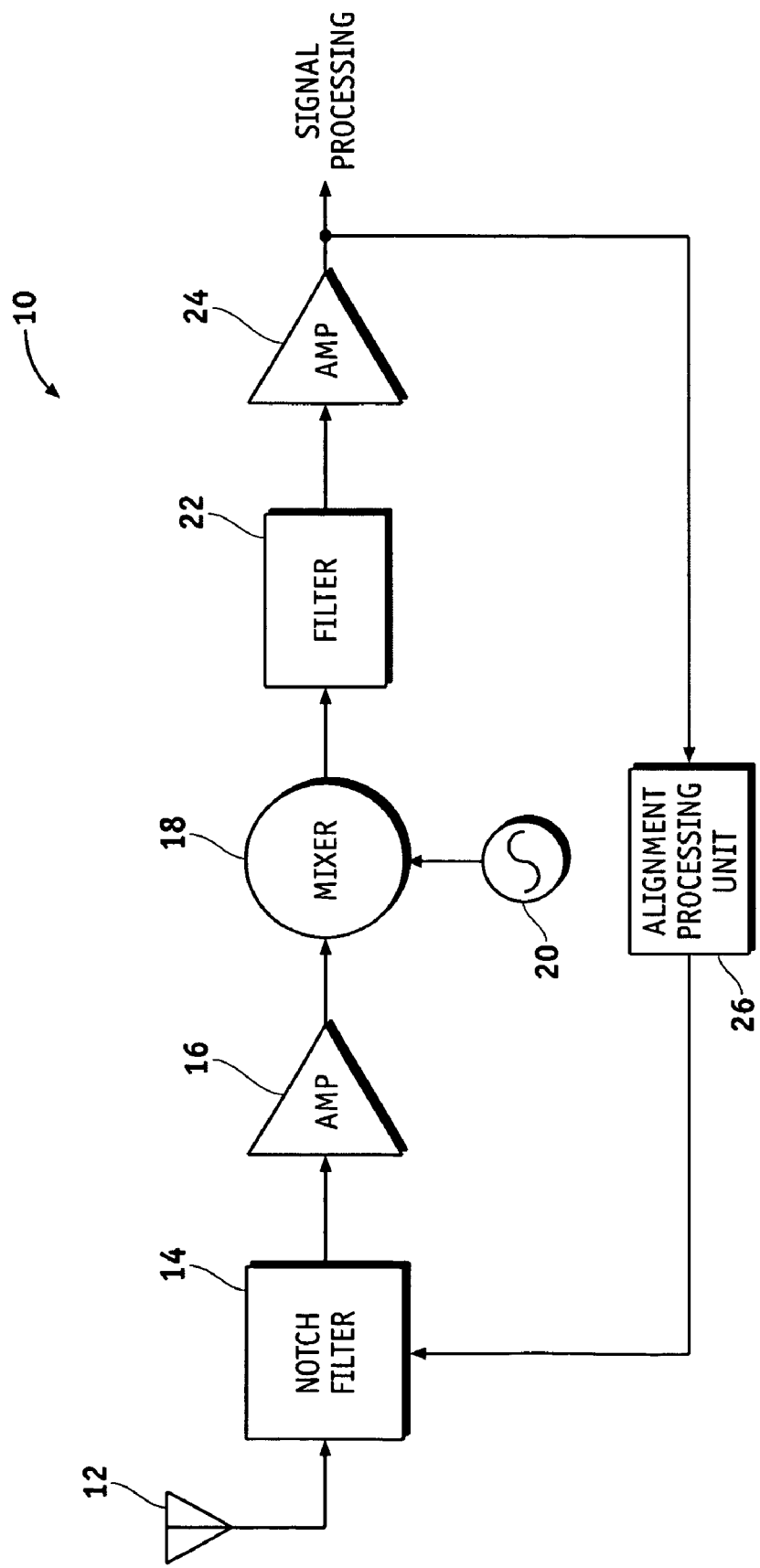
FIG. 1 is a schematic diagram of a portion of a receiver in accordance with an exemplary embodiment of the present invention.

Referring now to the drawings, FIG. 1 is a schematic diagram of a portion of a receiver 10 in accordance with an exemplary embodiment of the present invention. The receiver 10 comprises an antenna 12, a notch filter 14 having a first input coupled to the antenna 12, a first amplifier 16 having an input coupled to an output of the notch filter 14, a mixer 18 having a first input coupled to an output of the first amplifier 16, an oscillator 20 coupled to a second input of the mixer 18, a low pass filter 22 having an input coupled to an output of the mixer 18, a second amplifier 24 having an input coupled to an output of the low pass filter 22, and an alignment processing unit 26 having an input coupled to an output of the second amplifier 24 and having an output coupled to a second input of the notch filter 14. Although the receiver 10 has a single notch filter 14 on the input side of the mixer 18 and has a single filter 22 following the mixer 18, a different number of notch filters may be coupled to the input or output side of the mixer 18 and a different number of other filters (e.g., low pass filters) may be coupled to the output side of the mixer 18 along with additional amplifiers to maintain a desired signal strength. The receiver 10 may be incorporated as a component of a radio, such as an avionics radio or other radio.

The receiver 10 receives a Radio Frequency (RF) signal via the antenna 12 and rejects interfering signals from the RF signal by filtering the RF signal through one or more notch filters 14. Each of the notch filters 14 has a center frequency that may be varied by an input control voltage provided by the alignment processing unit 26. Initially, the center frequency of the notch filter 14 is calibrated or aligned to a pre-determined frequency. During an initial tune, the pre-determined frequency is an approximated notch filter value or an initial tune value. The term initial tune refers to aligning the notch filter 14 prior to an interfering signal being applied to the receiver 10. The initial tune value is used as an initial starting value for the notch filter during an adjusted tune. The term adjusted tune refers to improving the alignment state of the notch filter 14 after the receiver 10 has been in use. The number of notch filters may vary based on the number of pre-determined operational frequencies of the receiver 10 (e.g., operational frequencies associated with communications channels). Other factors such as minimizing the complexity of the receiver 10 may also limit the number of notch filters in the receiver 10. In one example, the notch filter 14 comprises a series capacitor and inductor, and varactor diodes may be used to tune the center frequency.

After filtering the RF signal through the notch filter 14, the first amplifier 16 amplifies the filtered RF signal, and the mixer 18 translates the RF signal to an Intermediate Frequency (IF) signal using an oscillation signal provided by the oscillator 20. The IF signal is filtered through the low pass filter 22 and amplified by the second amplifier 24. The low pass filter 22 is preferably a wide-band filter allowing for a measurement of a full-range of undesired signals. Additional filters and amplifiers may be included following the low pass filter 22 to further condition the IF signal. A variety of signal processing (e.g., demodulation, data detection, decryption, and the like) may be performed on the filtered IF signal after amplification by the second amplifier 24.

The alignment processing unit 26 analyzes the filtered IF signal to detect an energy content of the RF signal, after being filtered by the notch filter 14. Additionally, the alignment processing unit 26 locates the frequency of an interfering signal and monitors the energy of the interfering signal based on the energy content of the RF signal. By adjusting the center frequency of the notch filter 14 above and below the initial tune value and comparing the energy of the interfering signal before and after the adjustment to the center frequency, the alignment processing unit 26 tunes the notch filter 14 to a tune value that maximizes attenuation of the interfering signal. In an alternative embodiment, the alignment processing unit 26 tunes the notch filter 14 to a tune value that produces an attenuation of the interfering signal that is offset by a pre-determined value from the maximum attenuation of the interfering signal. The alignment processing unit 26 stores one or more tune values, each corresponding to the minimization of an interfering signal, for each notch filter. Additionally, although the mixer 18 is used to produce an IF signal, by multiplying the signal filtered by the notch filter 14 with an oscillation signal, the receiver 10 may directly provide the signal filtered by the notch filter 14 to the alignment processing unit in an alternative embodiment. In this alternative embodiment, the alignment processing unit 26 performs the digital signal processing on the RF signal filtered by the notch filter 14.

Figure 2:
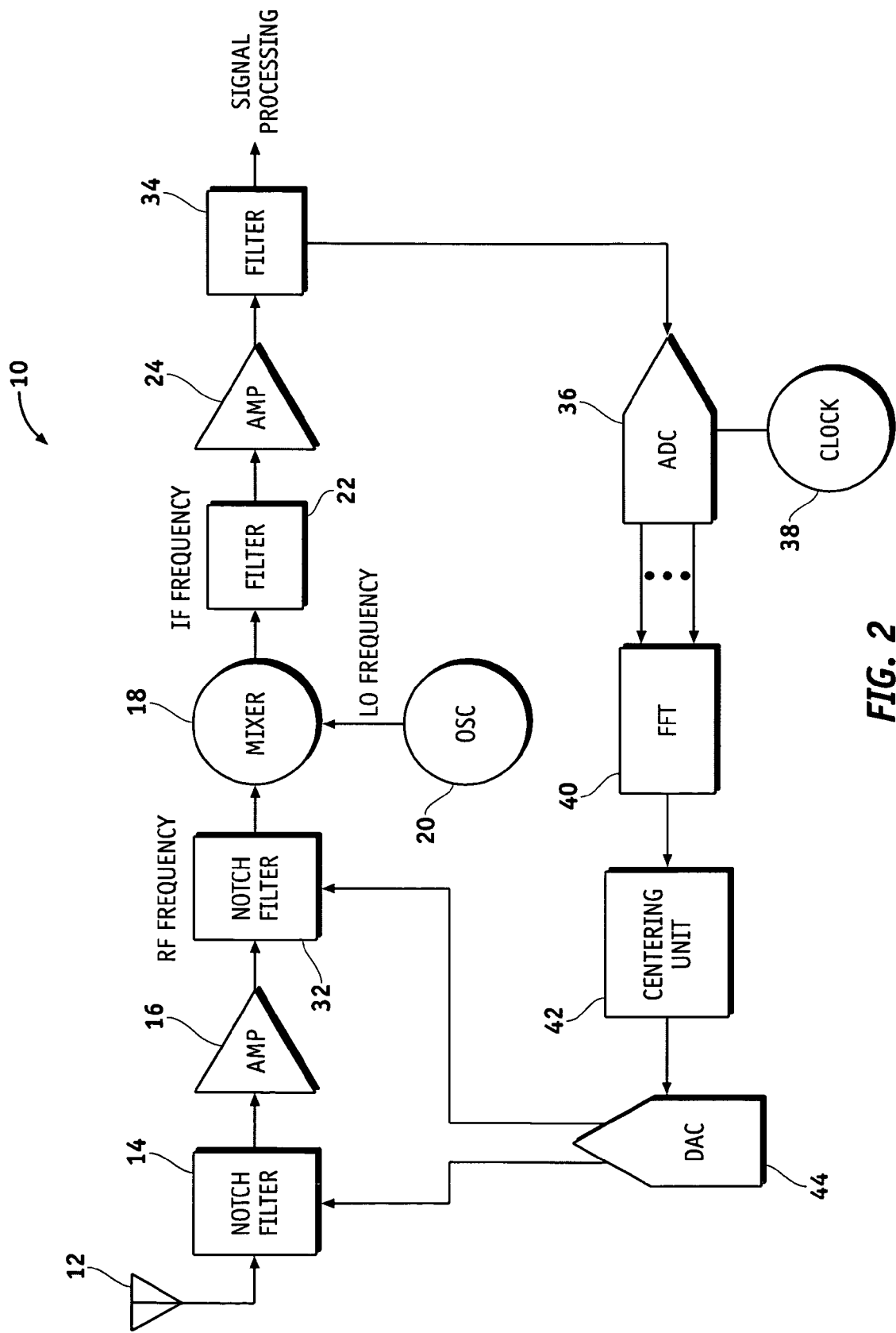
FIG. 2 is a more detailed schematic diagram of the receiver shown in FIG. 1.

FIG. 2 is a more detailed schematic diagram of the receiver 10 shown in FIG. 1. In this exemplary embodiment, the receiver 10 additionally comprises a second notch filter 32 and a second filter 34. The second notch filter 32 has a first input coupled to the output of the first amplifier 16, a second input, and an output coupled to the mixer 18, and a filter 34 having an input coupled to the output of the second amplifier 24 and having an output. The center frequency of the second notch filter 32 is different from the center frequency of the first notch filter 14 such that each notch filter 14, 32 may be aligned to a different interfering signal to reject the same. The second filter 34 may further filter the IF signal prior to analysis of the energy content of the RF signal by the alignment processing unit 26.

The alignment processing unit 26 comprises an analog-to-digital converter (ADC) 36 having a first input coupled the output of the second filter 34, a clock unit 38 coupled to a second input of the ADC 36, a signal analyzer 40 has an input coupled to an output of the ADC 36, a centering unit 42 having an input coupled to an output of the signal analyzer 40, and a digital-to-analog-converter (DAC) 44 having an input coupled to an output of the centering unit 42 and having an output coupled to the second inputs of the notch filters 14, 32.

The ADC 36 digitizes the filtered IF signal in sequence with a clock signal transmitted by the clock unit 38. In an exemplary embodiment, the signal analyzer 40 comprises a unit that applies a Fast Fourier Transform (FFT) function to the digitized signal from the ADC 36 and detects an energy content of the RF signal for a particular instant in time. Using the detected energy content of the RF signal, the centering unit 42 adjusts the center frequency of each notch filter 14, 32 away from the initial tune value and monitors the energy of the interfering signal as captured in the detected energy content of the RF signal. The centering unit 42 may tune or adjust the center frequency in relatively small, pre-determined increments above and/or below the initial tune value.

The centering unit 42 repeats tuning the center frequency away from the initial tune value and monitoring the energy of the interfering signal until the energy of the interfering signal is attenuated to a pre-determined attenuation (e.g., a maximum attenuation or an offset from the maximum attenuation). In an exemplary embodiment, the centering unit 42 compares the energy of the interfering signal prior to tuning the center frequency to a different tune value with the energy of the interfering signal after tuning the center frequency to the different tune value. At a tune value when the energy of the interfering signal is attenuated to the pre-determined attenuation, the centering unit 42 stores this tune value. As previously mentioned, this tune value may replace the prior initial tune value for a particular notch filter 14, 32, or may be stored as one of a number of initial tune values for future retrieval during an adjusted tune.

Figure 3:
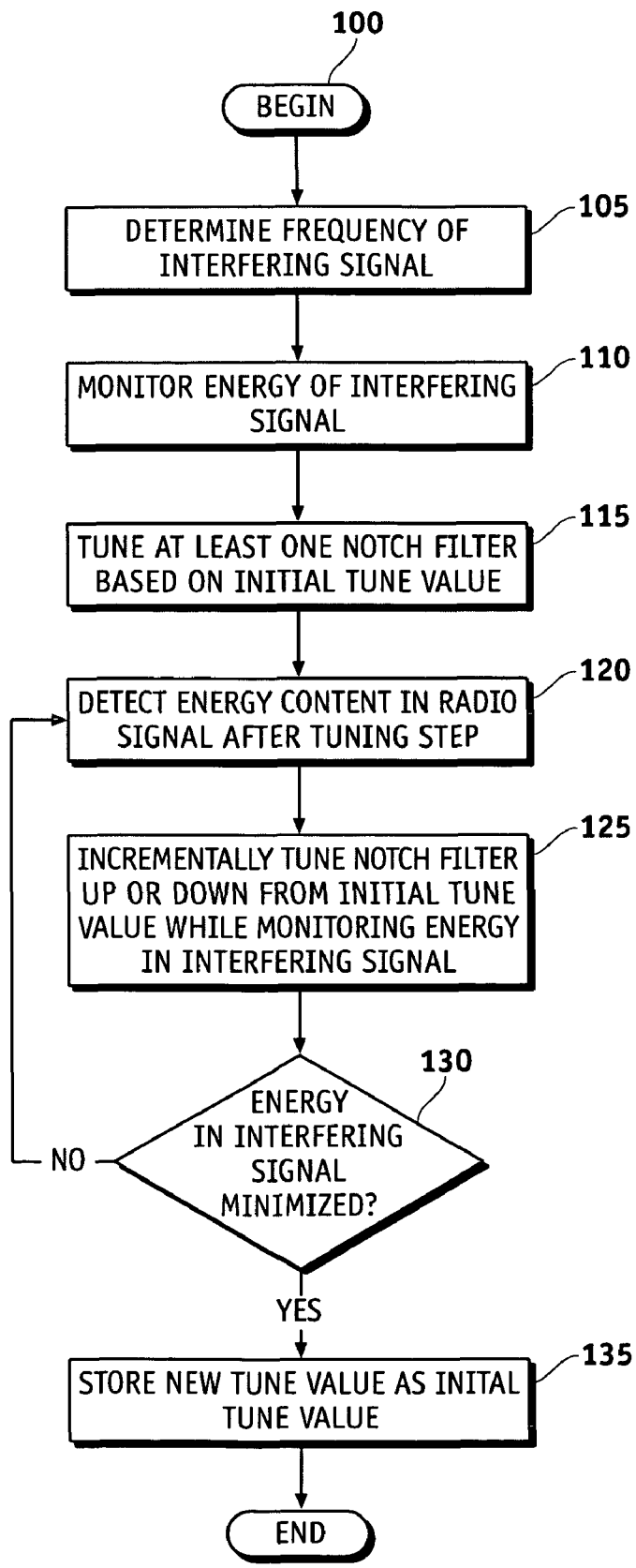
FIG. 3 is a flowchart of a method for aligning a notch filter to reject an interfering signal in a radio signal in accordance with an exemplary embodiment of the present invention.

FIG. 3 is a flowchart of a method for aligning a notch filter to reject an interfering signal in a radio signal in accordance with an exemplary embodiment of the present invention. Referring to FIGS. 2 and 3, the method begins at step 100. The centering unit 42 determines the frequency of the interfering signal at step 105. The centering unit 42 monitors the energy of the interfering signal at step 110. The centering unit 42 tunes at least one notch filter (e.g., notch filters 14, 16) based on an initial tune value at step 115. For example, one or more notch filters may be used to reject one or more interfering signals. The transform unit 40 detects the energy content in the radio signal after tuning the notch filter 14 at step 120. The centering unit 42 incrementally tunes the notch filter 14 up or down from the initial tune value while monitoring the energy in the interfering signal at step 125. The centering unit 42 determines if the energy in the interfering signal is at least partially minimized at step 130. In one exemplary embodiment, the centering unit 42 determines if the energy in the interfering signal is attenuated to a maximum degree. In another exemplary embodiment, the centering unit 42 determines if the energy in the interfering signal is attenuated to a pre-determined offset from the maximum degree. In the event the energy in the interfering signal is not at least partially minimized, the centering unit 42 repeats steps 120 and 125 until the energy in the interfering signal is at least partially minimized. In the event the energy in the interfering signal is at least partially minimized, the centering unit 42 stores the new tune value associated with the minimized energy of the interfering signal. In one embodiment, the centering unit 42 replaces the prior initial tune value with the new tune value. In another embodiment, the centering unit 42 save the new tune value as one of a number of tune value for use as an initial tune value in future alignments of the notch filters 14, 32.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for reducing an interfering signal in a radio signal, the system comprising:
    a first notch filter having first and second inputs and having an output, said first input of said first notch filter configured to receive the radio signal, said first notch filter configured to produce a first filtered signal at said output of said first notch filter;
    a signal analyzer having an input configured to receive an intermediate frequency (IF) signal and having an output, said IF signal based on said first filtered signal, said signal analyzer configured to detect an energy content in said radio signal;
    an amplifier having an input coupled to said output of said first notch filter and having an output;
    a processing unit having an input coupled to said output of said signal analyzer and having an output coupled to said second input of said first notch filter, said processing unit configured to:
    a) determine a frequency of the interfering signal and monitor an energy in the interfering signal;
    b) tune said first notch filter to an initial tune value; wherein the initial tune value indicates a previously determined interfering signal;
    c) detect an energy content in said radio signal;
    d) tune said first notch filter away from said initial tune value while monitoring said energy in the interfering signal;
    e) repeat c)-d) until said energy in the interfering signal is at least partially minimized at a new tune value for tuning of said first notch filter; and
    f) store the new tune value as said initial tune value for future alignment of said first notch filter and to compensate for changes in operation of said first notch filter; and
    a second notch filter having a first input coupled to said output of said amplifier, a second input coupled to said output of said processing unit, and an output, said second notch filter configured to produce a second filtered signal from said first filtered signal at said output of said second notch filter.

2. A system according to claim 1, wherein said signal analyzer comprises:
    a converter configured to produce a digitized signal from said IF signal; and
    a Fast Fourier Transform (FFT) unit coupled to said converter and configured to detect said energy content from said digitized signal.

3. A system according to claim 2, wherein said processing unit is further configured to:
    determine an energy in the interfering signal prior to d);
    determine an energy in the interfering signal after d); and
    tune said first notch filter based on a comparison of said energy in the interfering signal prior to d) and said energy in the interfering signal after d).

4. A system according to claim 1, wherein said processing unit comprises a digital-to-analog converter coupled to said first notch filter and configured to produce a voltage controlling said first notch filter.

5. A system according to claim 1 further comprising:
    a mixer having a first input coupled to said second notch filter, a second input configured to receive an oscillation signal, and an output, said mixer configured to produce the IF signal from said second filtered signal and said oscillation signal; and
    a low pass filter having an input coupled to said output of said mixer and having an output coupled to said input of said signal analyzer.

6. A method for reducing an interfering signal in a radio signal, the method comprising the steps of:
    filtering the radio signal through a first notch filter to an amplifier, and then through a second notch filter, the first notch filter having a center frequency tuned to an initial value, said filtering step comprising selecting the initial value from a plurality of pre-determined frequencies, each of the pre-determined frequencies indicating a previously determined interfering signal;
    translating the radio signal to an IF signal after said filtering step;
    detecting an energy content of the radio signal by fast Fourier transforming the IF signal;
    tuning the center frequency away from the initial value while monitoring an energy of the interfering signal; and
    repeating said detecting step and said tuning step until the energy in the interfering signal is at least partially minimized indicating a new value for tuning of said first notch filter; and
    storing the new value as the initial value for future alignment of said first notch filter and to compensate for changes in operation of said first notch filter.

7. A method according to claim 6, wherein said step of tuning comprises tuning the center frequency a pre-determined increment above the initial value or below the initial value.

8. A method according to claim 6, wherein said translating step comprises the steps of:
  producing the IF signal by mixing the radio signal with an oscillation signal; and
  low-pass filtering the IF signal.

9. A method according to claim 6 further comprising the step of storing the new value as one of a plurality of pre-determined values after said step of repeating.

10. A method for reducing an interfering signal in a radio signal, the method comprising the steps of:
  filtering the radio signal through a first notch filter to an amplifier, and then through a second notch filter, the first notch filter having a center frequency tuned to an initial value indicating a previously determined interfering signal;
  translating the radio signal to an IF signal after said filtering step;
  detecting an energy content of the radio signal by fast Fourier transforming the IF signal;
  tuning the center frequency away from the initial value while monitoring an energy of the interfering signal, wherein the center frequency is tuned a pre-determined increment above the initial value or below the initial value;
  repeating said detecting step and said tuning step until the energy in the interfering signal is at least partially minimized indicating a new value for tuning of said first notch filter; and
  storing the new value as the initial value for future alignment of said first notch filter and to compensate for changes in operation of said first notch filter.

* * * * *